United States Patent [19]

Prazmowski

[11] 4,258,011
[45] Mar. 24, 1981

[54] VEGETABLE OIL EXTRACTION APPARATUS

[76] Inventor: Bogdan D. E. Prazmowski, 45 Hayward Ct., Agincourt, Ontario, Canada

[21] Appl. No.: 106,518

[22] Filed: Dec. 26, 1979

[51] Int. Cl.³ .............................................. B01D 11/02
[52] U.S. Cl. .................................... 422/273; 422/274; 422/278
[58] Field of Search ................ 422/273, 274, 278, 281

[56] References Cited

U.S. PATENT DOCUMENTS

| | | | |
|---|---|---|---|
| 203,981 | 5/1878 | Adamson et al. | 422/278 |
| 1,319,661 | 10/1919 | Tone | 422/281 |
| 1,443,674 | 1/1923 | Blanc | 422/281 |

*Primary Examiner*—Frank Sever
*Attorney, Agent, or Firm*—Fleit & Jacobson

[57] ABSTRACT

An apparatus for extraction of vegetable oil from vegetable solids, by treatment thereof with solvents, comprises a vessel separated into an upper zone and lower zones by means of a movable perforated plate, upon which the vegetable solids material for extraction can be supported. Suitable solvent is fed into the bed of vegetable material, and percolated therethrough, to extract the oil, the solvent and oil passing downwardly through the perforated plates to collect in a lower zone of the vessel. Another lower zone of the vessel is adapted to receive the treated vegetable solids after the solvent extraction process, this lower zone being provided with movable cover plates, so that solvent and oil does not fall into this vegetable solids receiving zone. When the solvent extraction has been completed, the cover for the vegetable solids receiving zone is pivoted away to open the zone, and the perforated plates move to dump the treated vegetable solids into the lower vegetable solids receiving zone, separately from the solvent and extracted oil.

10 Claims, 3 Drawing Figures

VEGETABLE OIL EXTRACTION APPARATUS

FIELD OF THE INVENTION

This invention relates to vegetable oil extraction, and more particularly to a form of apparatus for extracting oil from vegetable solids which reduces the number of mechanican components utilized.

BACKGROUND OF THE INVENTION

Apparatus conventionally used for extraction of oil from vegetables, by a solvent extraction process, normally involves a series of motor driven movable strainers or buckets in which the vegetable material is contained, which are pulled through or rotate inside an extractor casing repeatedly and continuously. A solvent is sprayed upon the material in the moving buckets to extract the vegetable oil therefrom. It is also known to support vegetable material to be extracted upon moving performated conveyor belts, to move the vegetable oil through solvent treatment zones, and dump the residue at the end of the conveyor after the oil has been extracted.

These prior art arrangements all involve substantial, massive moving parts, for conveyance of the vegetable material, and are hence complicated to build and expensive to operate. They have substantial power requirements, since comparatively large amounts of vegetable material must be treated in such an apparatus, to make its operation economically feasible.

SUMMARY OF THE INVENTION

It is an object of the present invention to provide a novel form of vegetable oil extraction apparatus.

It is a further object to provide such an apparatus in which the number and size of moving parts is drastically reduced.

According to the present invention, the vegetable oil extraction apparatus for extracting vegetable oil from a vegetable material is provided in the form of a stationary vessel, divided into an upper, vegetable solids holding zone, and a plurality of lower liquid receiving zones and lower, extracted solids receiving zones. At the boundary of the upper, vegetable solids holding zone there is provided a movable perforated plate structure, upon which the vegetable material to be extracted can be supported. Solvent for extraction purposes is fed to the bed of vegetable material supported thereon, and percolates slowly through the bed, and downwardly through the perforated plates, to be collected in the lower, liquid receiving zones. There is also provided a solids receiving lower zone, which is covered during the percolation operation, to prevent entry of liquid material thereinto. When the extraction operation has been completed, the cover is removed from the solids receiving zone, and the perforated supporting plates are pivoted so as to dump the extracted vegetable pulp into the lower central zone. Thus according to the present invention, there is provided apparatus for solvent extraction of vegetable oil from certain vegetable solids, said apparatus comprising:

a vessel having an upper, vegetable solids holding zone, a lower, liquid receiving zone and a lower, extracted solids receiving zone;

means for supplying solvent to vegetable solids held in said holding zone;

foraminous support means movably mounted within said vessel, and movable between a first position in which the support means defines the lower boundary of said upper zone and supports vegetable solids held therein, and a second position in which the support means allows solids materials to pass from said upper zone to said lower solids receiving zones;

movable imperforate cover means located within said vessel, and movable between the closed position covering and preventing access to said lower solids receiving zone, and an open position providing access for solids material from the upper vegetable solids holding zone to the lower solids receiving zone.

BRIEF REFERENCE TO THE DRAWINGS

DESCRIPTION OF THE PREFERRED EMBODIMENT

Preferrably, the apparatus according to the present invention comprises a plurality of interconnected such units, each provided with its own vessel, foraminous support means and movable imperforate cover means, and each independently operable, but provided with common solids removable arrangements and solvent delivery arrangements. The individual vessels each preferably have a series of lower zones, in the form of elongated troughs, extending along the whole length of the bottom wall of a vessel. In the most convenient arrangement, there are provided two lower liquid receiving zones, one on each side of a centrally disposed solids receiving zone. In a series of such units according to the present invention, the solid receiving zone of each unit and the liquid receiving zones of each unit are in alignment, so that a common extraction means can be provided, extending along the whose length of such units. Suitably, the extraction means for the solids material is a rotatable screw conveyor.

The invention thus provides a vegetable oil solvent extraction apparatus which is simple to construct and easy to use. It contains very few moving parts. Reliance upon foraminous conveyors, movable buckets, chain drives and the like is eliminated, with simplification of structure and operation, along with reduction in power requirements. The cover means and the foraminous support means are movable over short distances, preferably pivoted to structural elements of the solvent extraction vessel. These can be moved manually, hydraulically, electrically or by any other suitable application of power means.

DETAILED DESCRIPTION OF THE SPECIFIC PREFERRED EMBODIMENT

Figure 1:
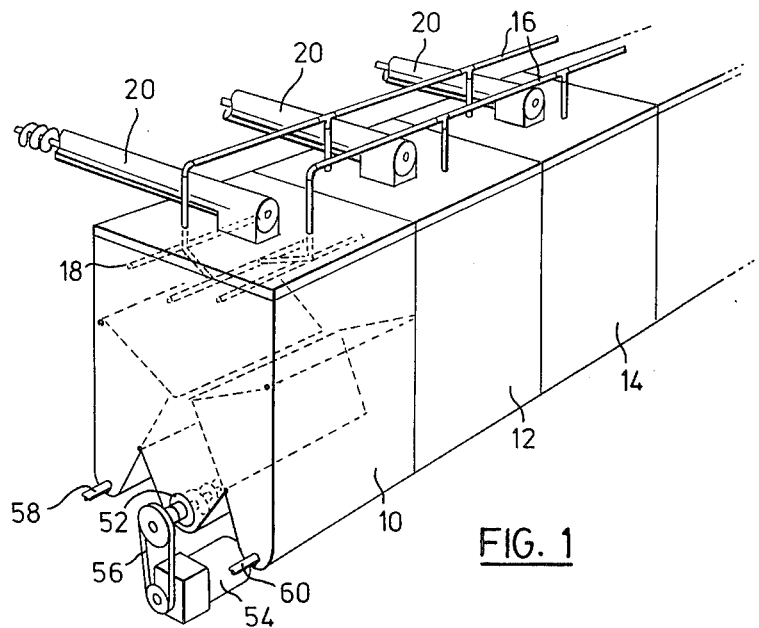
FIG. 1 is a diagrammatic, perspective view of a series of vegetable oil extraction apparatus according to the invention, interconnected for cooperative operation.

The apparatus illustrated in FIG. 1 comprises a series of vessels 10, 12, 14 etc., mounted adjacent to and alongside one another, and interconnected to provide an apparatus comprising several modules. Each of the vessels 10, 12, 14, etc., is rectangular as viewed in plan. A solvent supply system 16 is provided above the vessels, with solvent inlet pipes 18 connected thereto, for providing solvent to the upper portion of each of the vessels 10, etc. Similarly, each vessel 10, etc., is provided with an upper screw feed 20 for supplying solid vegetable material to the upper portion of the vessel.

Each vessel 10 has an upper zone 22 in which the solvent inlet pipes 18 are disposed, and to which the screw feed 20 delivers solid vegetable material 24 for extraction purposes. In the position of the apparatus shown in FIGS. 1 and 2, the bottom of upper zone 22 is defined by a pair of pivoted perforate plates 26, 28 pivotally secured at 30, 32 respectively to sidewall structures of the vessel 10.

Figures 2, 3:
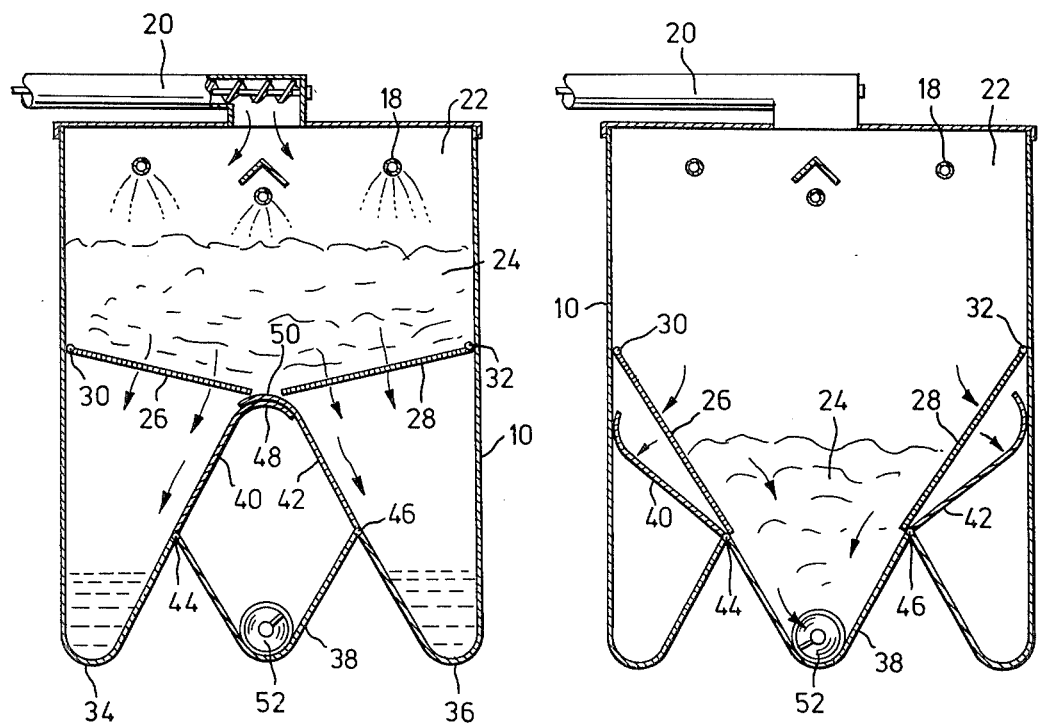
FIG. 2 is a sectional view of one of the units of FIG. 1, in the solvent extraction position.
FIG. 3 is a view similar to FIG. 2, in the solids removal position.

The lower portion of the vessel 10 is divided into three zones in the form of parallel extending troughs, the outer troughs 34, 36 being liquid receiving troughs, and the central trough 38 therebetween being a solids receiving trough. Imperforate cover means in the form of imperforate doors 40, 42 are provided, hingedly connected at 44, 46 respectively to the bottom wall of the vessel 10, at the junction between the outer trough 34 and the central trough 38, and the outer trough 36 and the central trough 38, respectively. These doors 40, 42 are provided with mutually cooperative curved upper extremities 48, 50 respectively, which mate together and provide mutual support for the doors when in their upper, closed position as shown in FIG. 2. In this position, the doors 40, 42 cooperate to cover the central zone 38 and prevent entry of material into this zone.

Also in the position shown in FIG. 2, i.e. the solvent extraction position, the cooperation between the doors 40, 42 at their upper extremities provides a support for the perforated plates 26, 28, holding them in an approximately horizontal position, for support the vegetable material 24 thereon.

With the apparatus set in the position shown in FIG. 2, vegetable material is held on the perforated plates 26, 28, solvent is supplied through solvent pipes 18, and the solvent percolates slowly through the bed 24 of vegetable material, downwardly through the perforated plates 26, 28, into the outer troughs 34, 36. When the solvent extraction has been completed in this manner, the perforated plates and doors of the vessel 10 are moved to the position illustrated in FIG. 3.

With reference to FIG. 3, the imperforate doors 40, 42 are removed from the location where they cover the central trough 38, by pivoting away from each other and outwardly about their hinged connections 44, 46, to rest against the sidewalls of the vessel 10. Now, the perforate plate 26, 28 move downwardly about their pivotal connections 30, 32 to the sidewalls of the vessel 10, and treated vegetable pulp 24 previously supported by the perforate plates 26, 28 is dumped into central trough 38. There is provided a screw conveyor 52, extending horizontally through the lower portion of the central trough 38, which can be rotated by motor 54 and drive belt 56 to feed the dumped material laterally outwardly from the vessel 10. This same screw conveyor 52 extends laterally through all of the vessels 10, 12, 14, etc., making up the modular unit.

Solvent (commonly hexene or hexene/alcohol) with vegetable oil suspended or dissolved therein is removed as liquid through horizontally extending liquid outlet pipes 58, 60 which extend through the respective outer troughs 34, 36 of the set of units 10, 12, 14, ets., with suitable inlet means for reception of the liquid deposited therein.

In accordance with normal practice, the apparatus according to the invention normally operates at an elevated temperature, e.g. about 90° F. as is well known in the prior art as a suitable temperature for such vegetable oil extraction by its solvent. The apparatus may be provided with appropriate heating means and insulation means, to ensure proper temperature maintenance and control.

The apparatus of the invention is thus simple to construct and easy to use, requiring merely the pivotal movement of four parts of the apparatus, for its proper operation, either automatically and power operated or manually. If desired, a suitable timing means can be employed to control the process, and ensure that the apparatus is moved to its dumping position at the right time, after full and total extraction of the oil from the vegetable solids.

Whilst a specific preferred embodiment of the invention has been illustrated and described in detail, it will be understood that the invention is not limited thereto. Other modifications and changes may be made, within the spirit and scope of the invention. The scope of the invention is limited only by the scope of the appended claims.

What I claim is:

1. Apparatus for solvent extraction of vegetable oil from vegetable solids having an extraction mode and a solids discharge mode, said apparatus comprising:
   a vessel having an upper, vegetable solids holding zone, a lower, liquid receiving zone and a lower, extracted solids receiving zone;
   means for supplying solvent to vegetable solids held in said holding zone;
   foraminous support means pivotally mounted within said vessel, and pivotal between a first position in which the support means defines the lower boundary of said upper zone and supports vegetable solids held therein to cooperate in providing said extraction mode, and a second position in which the support means allows solids materials to pass from said upper zone to said lower solids receiving zone to cooperate in providing said solids discharge mode;
   movable imperforate cover means located within said vessel, and coacting with said foraminous support means to pivot between a closed position covering and preventing access to said lower solids receiving zone to cooperate in providing said extraction mode, and to pivot to an open position providing access for solids materials from the upper vegetable solids holding zone to the lower solids receiving zone to cooperate in providing said solids discharge mode.

2. Apparatus according to claim 1 including first and second lower liquid receiving zones, disposed on opposite sides of said lower, extracted solids receiving zone.

3. Apparatus according to claim 2 wherein said vessel is generally rectangular as viewed in plan, said lower zones comprising elongated troughs extending mutually parallel to one another along the bottom of said vessel.

4. Apparatus according to claim 3 wherein said movable imperforate cover means comprises a pair of similar doors, each hingedly connected along its lower edge to the bottom of the vessel and extending upwardly therefrom, said doors engaging each other at their upper parts in their closed position to cover the center, solids receiving trough, and being separated from one another in their open position.

5. Apparatus according to claim 4 wherein said mutually parallel, elongated troughs occupy substantially the full extent of the bottom of the vessel, the doors of the imperforate cover means being hingedly connected to the elongated ridges formed respectively between the centre, solids receiving trough and the side, liquid receivin trough.

6. Apparatus according to claim 5 wherein, in their open position, the doors of the imperforate cover means rest against opposed side walls of the vessel and cover respective ones of said lower, liquid receiving zones.

7. Apparatus according to claim 6 wherein said foraminous support means comprises a pair of mutually opposed perforated plates, hingedly connected along one edge to opposed side walls of said vessel and extending inwardly towards the centre trough.

8. Apparatus according to claim 7 wherein the perforated plates, in their first position, rest upon the mutually engaging upper parts of the imperforate doors in their closed positions.

9. Apparatus according to claim 8 wherein the perforated plates, in their open position, extend downwardly to rest against the lower ends of respective ones of said imperforate doors.

10. Apparatus according to claim 8 including means for feeding vegetable material to said upper zone, means for feeding solvent to vegetable material contained in said upper zone, solids removal means extending along the bottom of said central trough, said solids removal means comprising a rotatable screw conveyor.

* * * * *